Jan. 28, 1969  B. T. HARRIS  3,424,014
CRANK ARM ASSEMBLY
Filed March 24, 1967
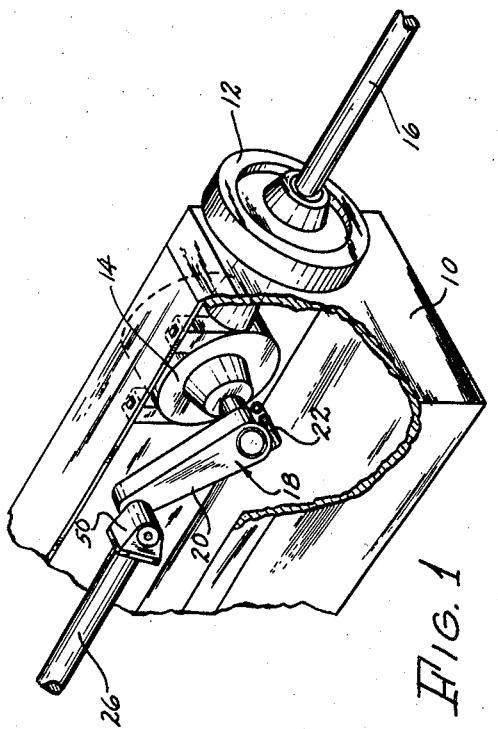
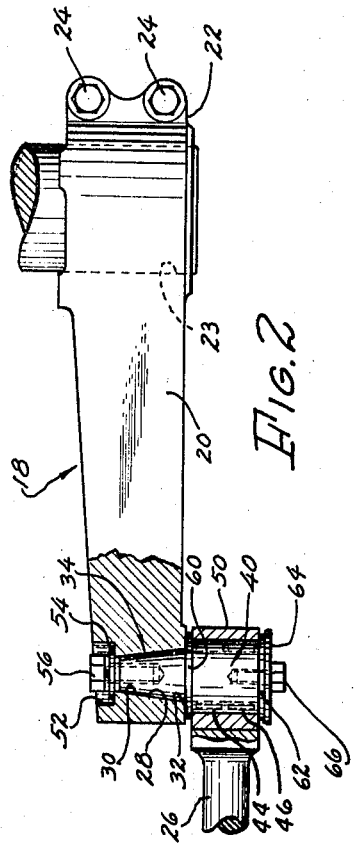
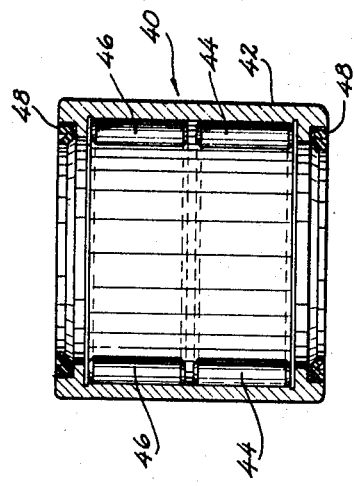
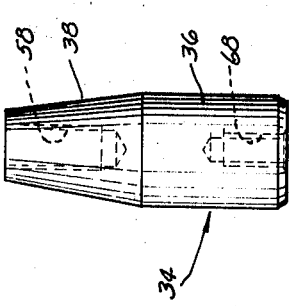
INVENTOR
BOLIVER T. HARRIS
BY:
    ATT'Y
    AG'T

United States Patent Office 3,424,014
Patented Jan. 28, 1969

3,424,014
CRANK ARM ASSEMBLY
Boliver T. Harris, Bettendorf, Iowa, assignor to Motorola, Inc., Franklin Park, Ill., a corporation of Illinois
Filed Mar. 24, 1967, Ser. No. 625,643
U.S. Cl. 74—44          3 Claims
Int. Cl. F16h 21/18

ABSTRACT OF THE DISCLOSURE

A crank arm assembly having an arm with a tapered opening for receiving a tapered pin, and a roller bearing journaled on the pin. The tapered pin and bearing are positioned to drivingly connect the arm and a plunger pitman for a baler.

Background of the invention

A device generally known as a crank arm has been used for driving a plunger for a hay baler, the crank arm being connected to the plunger pitman. The crank arm is normally connected to a countershaft, which in turn is driven by means of gears or the like from a flywheel and a power take-off from the tractor or from a separate baler-mounted engine. The crank arm imparts a reciprocating motion to the pitman and plunger in compressing the crop material so it is seen that the arm performs a very important function in the baling process. The prior machines have used a generally horizontally disposed arm with a crank pin as an integral part thereof, together with a bushing on the pin for journaling of the pitman. Other machines have used self-aligning ball bearings on the crank pin for carrying one end of the pitman rod.

The bushing and pin construction has several drawbacks in that as the bushing wears during operation of the baler plunger, the pitman is not maintained in alignment. A ball bearing also has the disadvantage of occupying premium space in the baling chamber when the crank arm is in the forwardmost position during the reciprocating cycle. Of course, a crank arm with an integral crank pin requires replacement of the entire crank arm assembly when the pin becomes worn. The problem of replacing the crank arm itself when the pin becomes worn is unnecessarily expensive and new and improved means are sought to reduce the costs of producing and of maintaining a baler. Of course, improving the relative alignment of the crank arm with the plunger is also extremely important in the operation of the baler.

Summary of the invention

This invention covers an improved crank arm assembly for a baler and more specifically provides a replaceable crank pin with a roller bearing journaled on the pin. The crank arm has an opening at one end tapered to receive the tapered crank pin and the bearing is of the double roller type to accommodate slight misalignment of the pitman with the crank arm.

The main object of the invention is to provide an improved crank arm assembly.

Another object is to provide a crank arm with a replaceable crank pin.

A further object is to provide a crank arm assembly with a double roller bearing to minimize misalignment of the assembly and to accommodate any slight misalignment of the assembly.

Further objects and advantages will become apparent from a reading of the following specification taken together with the annexed drawings, in which:

FIG. 1 is a perspective view of a fragment of a baler showing the position of the crank arm assembly;

FIG. 2 is a plan view of the crank arm assembly partly in section to show the roller bearing structure;

FIG. 3 is a view of the replaceable tapered crank pin; and

FIG. 4 is a sectional view of the roller bearing assembly.

Referring to the drawings there is shown in FIG. 1, a fragmentary view of a baler having a baling chamber 10, a flywheel 12, and a gear box 14. A power take-off shaft 16 is connected to the flywheel, the shaft being driven from a tractor. A drive shaft also connects the flywheel to a bevel gear in gear box 14. A countershaft extends perpendicular to the drive shaft and is connected by means of the bevel gears in box 14 to the drive shaft. As thus far described, the construction of the baler parts is typical and is included to provide the environment for the invention.

A crank arm assembly, generally designated as 18, includes a first member or crank arm 20 having a head 22 at one end thereof connected to the countershaft such that as the flywheel and drive shaft rotate by reason of the rotation of the power take-off shaft, the countershaft is driven, which in turn drives the pitman and arm to provide a reciprocating motion to the plunger which is not shown but which is commonly positioned in the baling chamber. Head 22 of arm 20 includes a bore 23 suitable for receiving one end of the countershaft and is secured to the countershaft by means of bolts 24. Crank arm head 22 is bifurcated such that as bolts 24 are tightened, the two parts are drawn together over one end of the countershaft and thus made secure. Crank arm 20 is a generally longitudinal member which swings about the crankshaft in a fore-and-aft direction in the baling chamber.

Connected to the other end of arm 20 is a second member or pitman 26 which drives the plunger in the reciprocating motion. Pitman 26 is pivotally connected to the plunger by suitable means to accommodate this motion.

The important part of the present invention is in the connection of the crank arm 20 and pitman 26. As seen in FIG. 2, arm 20 includes a tapered opening or bore 28 near one end thereof, the diameter of the opening increasing from one side 30 of the arm to the other side 32. While this opening may be made smooth, it may also be splined to provide for a more secure connection. A crank pin 34, as seen in detail in FIG. 3, includes a generally straight portion 36 and a tapered portion 38. Of course, these portions are circular in cross-sectional area and the tapered portion fits into opening 28 in arm 20. The adjacent straight portion is constructed to carry a bearing. A roller bearing 40, shown in section in FIG. 4, includes an enclosure 42 which contains rollers 44 and 46, it being understood that there are a plurality of each of rollers 44 and 46 around the interior portion of enclosure 42. Seals 48 are provided at the ends of the enclosure to contain a lubricant and to prevent entrance of dirt. A cap 50 fits over the bearing 40, and the cap is rigidly secured to the pitman 26. The use of the rollers 44 and 46 on pin 34 reduces the overall size of the connection for a given crank arm and therefore requires less space in the baling chamber for the reciprocating assembly.

As stated above, opening 28 may be splined and, of course, pin 34 would have meshing splines on the tapered portion thereof to make the connection secure. Arm 20 also includes a recess 52 in side 30 to accommodate a washer 54 and a stud 56, the stud being insertable into the threaded hole 58 in pin 34. The stud is inserted to draw pin 34 tightly into the crank arm. Washers 60 and 62 are used adjacent the ends of the bearing. A plate 64 is positioned next to washer 62 and a stud 66 is inserted through the plate and washer and into a threaded hole 68 in pin 34. Stud 66 in hole 68 holds plate 64 against bearing 40 so that the crank arm assembly and cap 50 are maintained secure around pin 34. As seen in FIG. 2, the double rollers ride on and around pin 34 in enclosure 42. Pin 34 is hardened and ground and thus serves as the inner bearing race.

It is thus seen that herein shown and described is a crank arm assembly wherein the connecting pin is replaceable when it becomes worn, a double roller bearing is provided which accommodates slight misalignment of the first and second members, and the crank pin itself serves as an inner bearing race. The assembly accomplishes all the advantages and objects of the invention. While only one embodiment has been described, it is to be understood that variations can be made by one skilled in the art. The invention as shown and described is not intended to be taken as limited by the embodiment disclosed, nor in fact in any manner, except as defined by the annexed claims.

What is claimed as new and desired to be secured by Letters Patent of the United States is:

1. In a crank arm assembly including a reciprocable pitman rod and a rotatable crank arm, drive means for rotating said crank arm about an axis at one end of said crank arm, said crank arm extending along a line transverse to said axis and said pitman rod extending along a line parallel to said line, a crank pin connecting the other end of said crank arm and said pitman rod together for reciprocating said pitman rod along said parallel line upon rotation of said crank arm, the improvement comprising said other end of said crank arm and said pitman rod both having an opening for receiving said crank pin, releasable fastening means extending between said crank pin and both of said crank arm and said pitman rod for releasably securing said crank pin to both said crank arm and said pitman rod, one end of said crank pin and said opening in said crank arm both being tapered and with the tapered opening snugly receiving the tapered end of said crank pin, the other end of said crank pin being cylindrical and extending to a side of said crank arm toward said parallel line locating said pitman rod, an antifriction bearing of a double-row type disposed in said opening in said pitman rod and with the two rows of said bearing arranged spaced apart to be side-by-side in said pitman rod opening and snugly receiving said cylindrical end of said crank pin for rotatably connecting said crank pin to said pitman rod in a minimum friction connection and with a minimum of adverse effect in the event said crank arm and said pitman rod are mis-aligned in their longitudinal extents.

2. The subject matter of claim 1, wherein said tapered end of said crank pin has a threaded hole extending axially of said crank pin and said releasable fastening means connecting said crank pin and said crank arm is a screw extending into said threaded hole and is in abutting relation with said crank arm for pulling said crank pin snugly into said tapered opening in said crank arm.

3. The subject matter of claim 2, wherein said threaded hole extends beyond the length of said screw in the snugly assembled position, so that the screw can be further tightened, in the event of wear between said crank pin tapered end and said crank arm at said tapered opening, to again snugly seat said tapered pin in said tapered opening.

References Cited

UNITED STATES PATENTS

| | | | |
|---|---|---|---|
| 694,909 | 3/1902 | Christopher | 308—208 |
| 2,318,903 | 5/1943 | Thomas | 308—208 |
| 3,134,266 | 5/1964 | Wallace | 74—44 |
| 3,210,108 | 10/1965 | Herbenar | 287—93 |
| 2,750,811 | 6/1956 | Hollyday et al. | |
| 2,957,407 | 10/1960 | Vutz et al. | |
| 3,227,002 | 1/1966 | Gholson. | |

FRED C. MATTERN, Jr., *Primary Examiner.*

W. S. RATLIFF, Jr., *Assistant Examiner.*

U.S. Cl. X.R.

308—208; 287—93